(12) United States Patent
Okahashi

(10) Patent No.: US 6,473,074 B1
(45) Date of Patent: Oct. 29, 2002

(54) COORDINATE DATA INPUT DEVICE

(75) Inventor: Masanori Okahashi, Tokyo (JP)

(73) Assignee: Fujitsu Takamisawa Component Limited, Tokyo (JP)

( * ) Notice: Subject to any disclaimer, the term of this patent is extended or adjusted under 35 U.S.C. 154(b) by 0 days.

(21) Appl. No.: 09/461,294

(22) Filed: Dec. 15, 1999

(30) Foreign Application Priority Data

Dec. 16, 1998 (JP) ............................................ 10-357760

(51) Int. Cl.[7] ........................... G06G 5/00; G06K 11/06; G06K 11/18
(52) U.S. Cl. .................... 345/174; 345/173; 178/18.01; 178/18.05; 178/19.04
(58) Field of Search ................................. 345/173, 174, 345/178; 178/18.05, 18.01, 19, 18.03

(56) References Cited

U.S. PATENT DOCUMENTS

| | | | | |
|---|---|---|---|---|
| 4,529,959 A | * | 7/1985 | Ito et al. ...................... | 345/174 |
| 5,159,159 A | * | 10/1992 | Asher .......................... | 178/18 |
| 5,283,558 A | * | 1/1994 | Chan ........................... | 345/168 |
| 5,451,724 A | * | 9/1995 | Nakazawa et al. ........... | 345/173 |
| 5,506,375 A | * | 4/1996 | Kikuchi ....................... | 178/18 |
| 5,574,262 A | * | 11/1996 | Petty .......................... | 345/173 |
| 5,589,857 A | * | 12/1996 | Tanahashi et al. ........... | 345/174 |
| 5,847,690 A | * | 12/1998 | Boie et al. .................. | 345/174 |

FOREIGN PATENT DOCUMENTS

JP          53-129831          11/1978

\* cited by examiner

*Primary Examiner*—Bipin Shalwala
*Assistant Examiner*—David L Lewis
(74) *Attorney, Agent, or Firm*—Staas & Halsey LLP

(57) ABSTRACT

A coordinate data input device comprising a pair of detecting members, a spacer disposed between the detecting members, and a ground conductor element disposed between the detecting members. Each detecting member includes an insulating substrate, a resistance film provided on the insulating substrate and a conductor formed on the insulating substrate to be electrically connected with the resistance film. The detecting members are arranged in a face-to-face manner in that respective resistance films of the detecting members are opposed to each other. The spacer defines a gap between the respective resistance films, while permitting the resistance films to be shorted to each other when at least one of the detecting members is deformed. The ground conductor element substantially surrounds the resistance films and conductors of the detecting members.

14 Claims, 10 Drawing Sheets

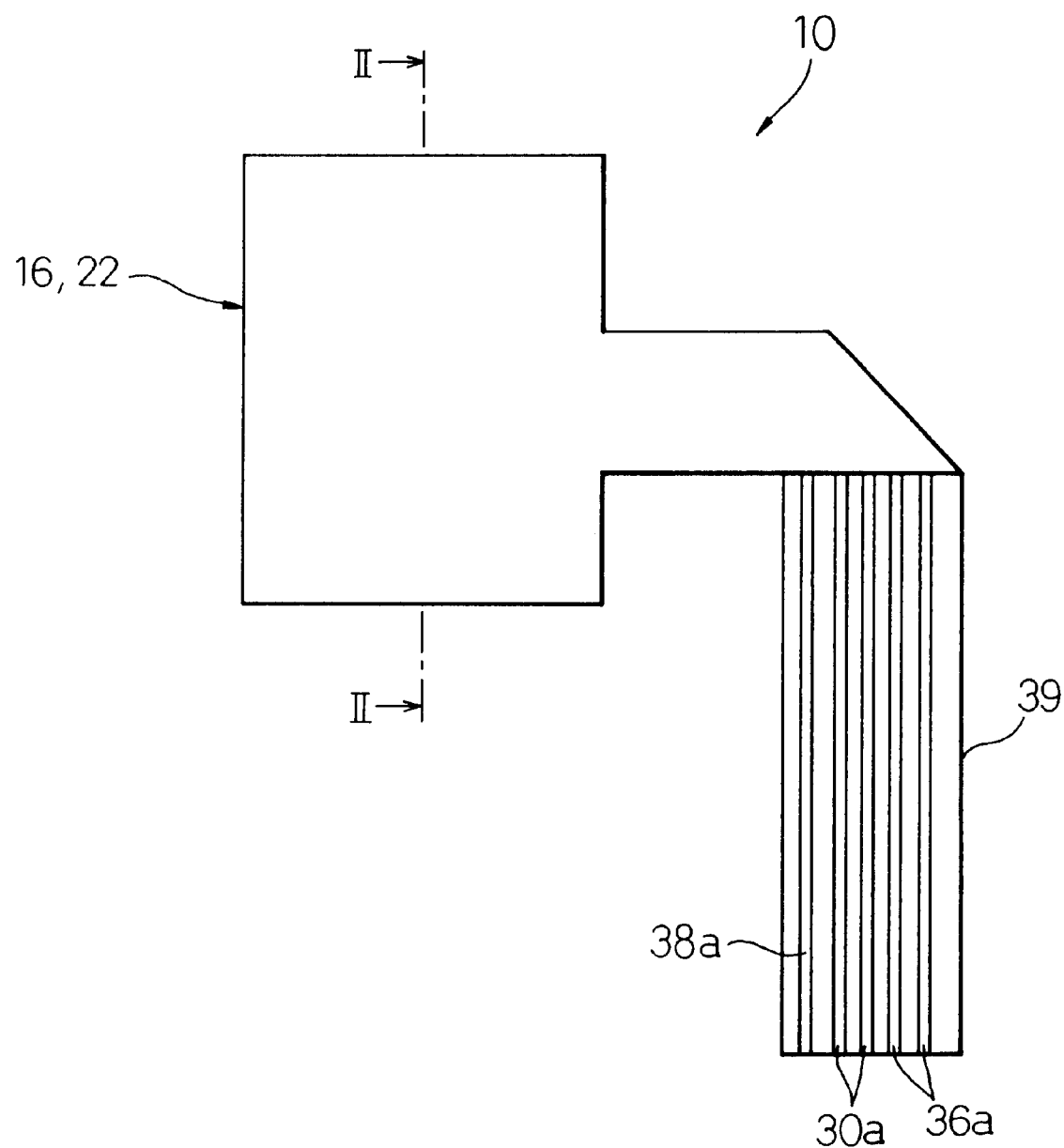

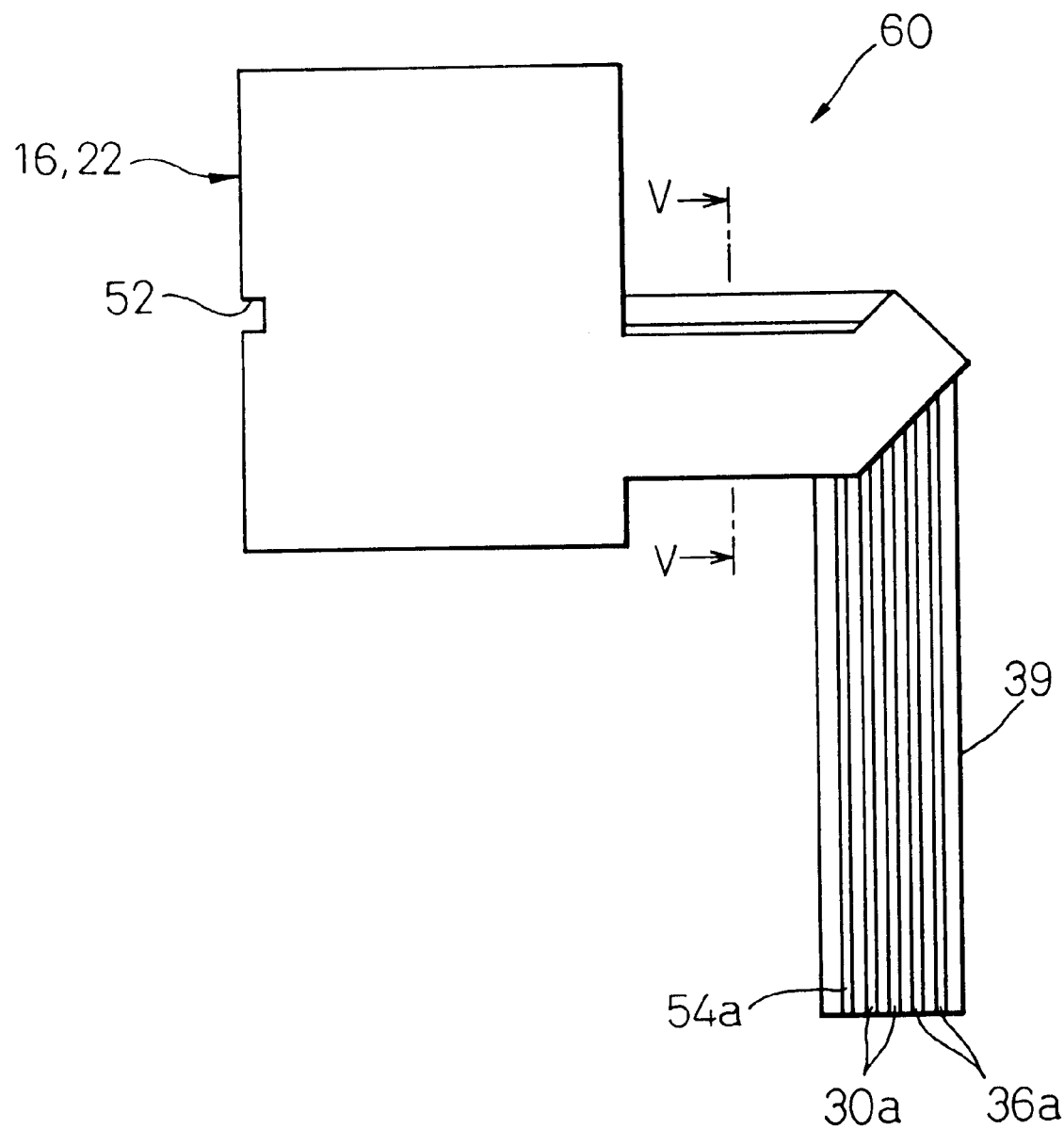

COORDINATE DATA INPUT DEVICE

BACKGROUND OF THE INVENTION

1. Field of the Invention

The present invention generally relates to an input device and, more particularly, to a coordinate data input device comprising a pair of detecting members, each including a resistance film provided on the surface of an insulating substrate.

2. Description of the Related Art

Recently, a coordinate data input device for indicating two-dimensional coordinate data on a display screen, which can be operated by an analog data-entering operation through, e.g., an operator's finger, has been widely used in digital data processors with displays incorporated therein, such as a personal computer, a word processor, an electronic notebook, etc. In particular, a coordinate data input device of a touch-sensitive type, adapted to be incorporated in the display such as LCD (a liquid crystal display) or CRT (a cathode-ray tube), or in a keyboard or a mouse provided in the data processors, has been known by the name of a touchscreen or a touchpad.

A conventional, touch-sensitive type coordinate data input device generally includes a pair of plate-like detecting members, each provided with an insulating substrate and a resistance film formed on the surface of the insulating substrate. The detecting members are mutually superimposed through a gap, with resistance films being opposed to each other. The gap between the detecting members is ensured by a large number of dot spacers arranged and distributed on the surface of the resistance film of one detecting member. The dot spacers serve to prevent the detecting members from being deformed due to a self-weight so as to maintain the gap between the detecting members, while permitting the resistance films to be shorted when at least one of detecting members is deformed under a pushing force.

Each detecting member is also provided with a pair of electrodes (or an electrode pair) respectively laid along opposed outer peripheral regions of the resistance film so as to be electrically connected with the latter. In the pair of superimposed detecting members, the electrode pairs thereof are located at angularly positions shifted by, generally, 90 degrees relative to each other. In this structure, a predetermined voltage is alternately applied to the resistance films between the pair of electrodes of each resistance film. In this state, when an operator pushes by, e.g., his finger a desired location of the outer surface of the insulating substrate of one detecting member, the resistance films are shorted to each other at the location of the pushed portion, and thereby a partial voltage corresponding to the location of the pushed portion is measured in the resistance film to which the voltage is not applied. In this way, partial voltages alternately generated in the respective resistance films are measured, and thereby the two-dimensional coordinate of the pushed location is determined.

The pair of electrodes in each detecting member are connected respectively with a pair of wiring strips which are arranged on the insulating substrate to be spaced from the resistance film. The electrodes and the wiring strips are normally patterned on the surface of the insulating substrate as a conductor. Generally, the insulating substrate of each detecting member includes a major part for carrying the resistance film and electrode pair, and an appendage part extending from the major part. The wiring strips in each detecting member are laid on the major and appendage parts of the insulating substrate, so as to be converged at the distal end of the appendage part, and are connected to external signal and power circuits through a connector. In this structure, a voltage is applied to the resistance film of each detecting member through the wiring strips and the electrode pair, and the partial voltages are measured as described above, whereby the coordinate data is entered.

In the touch-sensitive type coordinate data input device having above-described structure, if an electro-static discharge occurs on the detecting members, the discharge may penetrate inside the input device through the outer peripheral region of the superimposed pair of detecting members, and reach the conductors on the insulating substrates. As a result, a high voltage is instantaneously applied to the conductors, i.e., the electrodes and wiring strips, which may damage electronic parts such as an IC in the signal circuit connected with the wiring strips.

One solution for preventing the external circuit from being damaged due to the electro-static discharge can be provided, wherein an electric conductive plate connected to a ground is arranged in an equipment housing into which the coordinate data input device is incorporated, so as to be located along the outer peripheral region of the detecting members. According to this structure, the electro-static discharge occurs mainly on the conductive plate, and thereby the discharge may be prevented from penetrating inside the coordinate data input device. Another solution can also be provided, wherein the dimension of the insulating substrates of the detecting members is sufficiently enlarged in comparison with the resistance films so as to increase the distance between the outer peripheral edge of the insulating substrates and the conductors. In this structure, the electro-static discharge also hardly reaches the conductors. Alternatively, a clamp diode may be arranged between the wiring strips and the signal circuit, which can prevent the signal circuit from being damaged even when an electro-static discharge occurs on the conductors in the coordinate data input device.

However, the solution using the conductive plate or clamp diode may cause the problems in that the number of parts as well as the number of assembling steps, of the coordinate data input device as well as of an electronic equipment including the same, are increased, and thus a manufacturing cost significantly rises. On the other hand, if the dimension of the insulating substrates is enlarged to such an extent that the discharge on the conductor hardly occurs, it becomes difficult to ensure an installation space for the coordinate data input device particularly in a case where the device is a touch-sensitive type pointing device or a touchpad adapted to be incorporated in a keyboard or mouse.

SUMMARY OF THE INVENTION

It is, therefore, an object of the present invention to provide a coordinate data input device of a touch-sensitive type, having excellent resistance against an electro-static discharge, which can be readily produced without increasing the number of parts or assembling steps, so as to prevent a remarkable rise in manufacturing cost.

It is another object of the present invention to provide a coordinate data input device of a touch-sensitive type, which can provide excellent resistance against an electro-static discharge, without excessively enlarging the dimension of the device.

In order to accomplish the above objects, the present invention provides a coordinate data input device comprising a pair of detecting members, each of which includes an insulating substrate, a resistance film provided on the insulating substrate and a conductor formed on the insulating substrate to be electrically connected with the resistance film, the pair of detecting members being arranged in a face-to-face manner in that respective resistance films of the detecting members are opposed to each other; a spacer disposed between the pair of detecting members to define a gap between the respective resistance films, the spacer permitting the resistance films to be shorted with each other when at least one of the detecting members is deformed; and a ground conductor element disposed between the pair of detecting members, the ground conductor element substantially surrounding the resistance films and conductors of the detecting members.

In the above coordinate data input device, the ground conductor element may be formed as single electrically conductive line patterned on the insulating substrate of one of the detecting members.

Alternatively, the ground conductor element may be formed as a pair of electrically conductive lines respectively patterned on insulating substrates of the detecting members.

In this arrangement, it is preferred that the pair of electrically conductive lines are partially overlapped with each other.

Also, it is advantageous that an electrically conductive piece is interposed between overlapped portions of the pair of electrically conductive lines.

The electrically conductive piece may be made of an electrically conductive adhesive.

The insulating substrate of each of the detecting members may include a major part for carrying the resistance film and an appendage part extending from the major part, and insulating substrates of the detecting members may be integrally joined with each other through respective appendage parts.

In this arrangement, the conductor of each of the detecting members may be laid on the major part and continuously on the appendage part, and the ground conductor element may be laid on the major part and continuously on the appendage part of at least one of the detecting members.

The conductor of one of the detecting members may include a pair of first electrodes electrically connected with the resistance film of the one detecting member and a pair of first wiring strips extending respectively from the first electrodes and patterned on the insulating substrate of the one detecting member, and the conductor of the other of the detecting members may include a pair of second electrodes electrically connected with the resistance film of the other detecting member and a pair of second wiring strips extending respectively from the second electrodes and patterned on the insulating substrate of the other detecting member, the pair of first electrodes being oriented generally orthogonally to the pair of second electrodes.

Alternatively, the conductor of one of the detecting members may include a pair of first electrodes electrically connected with the resistance film of the one detecting member and a pair of first wiring strips extending respectively from the first electrodes and patterned on the insulating substrate of the one detecting member, and the conductor of the other of the detecting members may include a single electrode electrically connected with the resistance film of the other detecting member and a single second wiring strip extending from the second electrode and patterned on the insulating substrate of the other detecting member, the pair of first electrodes being oriented generally orthogonally to the second electrode.

BRIEF DESCRIPTION OF THE DRAWINGS

The above and other objects, features and advantages of the present invention will become more apparent from the following description of preferred embodiments in connection with the accompanying drawings, in which:

FIG. 1B is a plan view showing the coordinate data input device of FIG. 1A in a folded usable state;

FIG. 4B is a plan view showing the coordinate data input device of FIG. 4A in a folded usable state;

DETAILED DESCRIPTION OF THE PREFERRED EMBODIMENTS

Figure 1A:
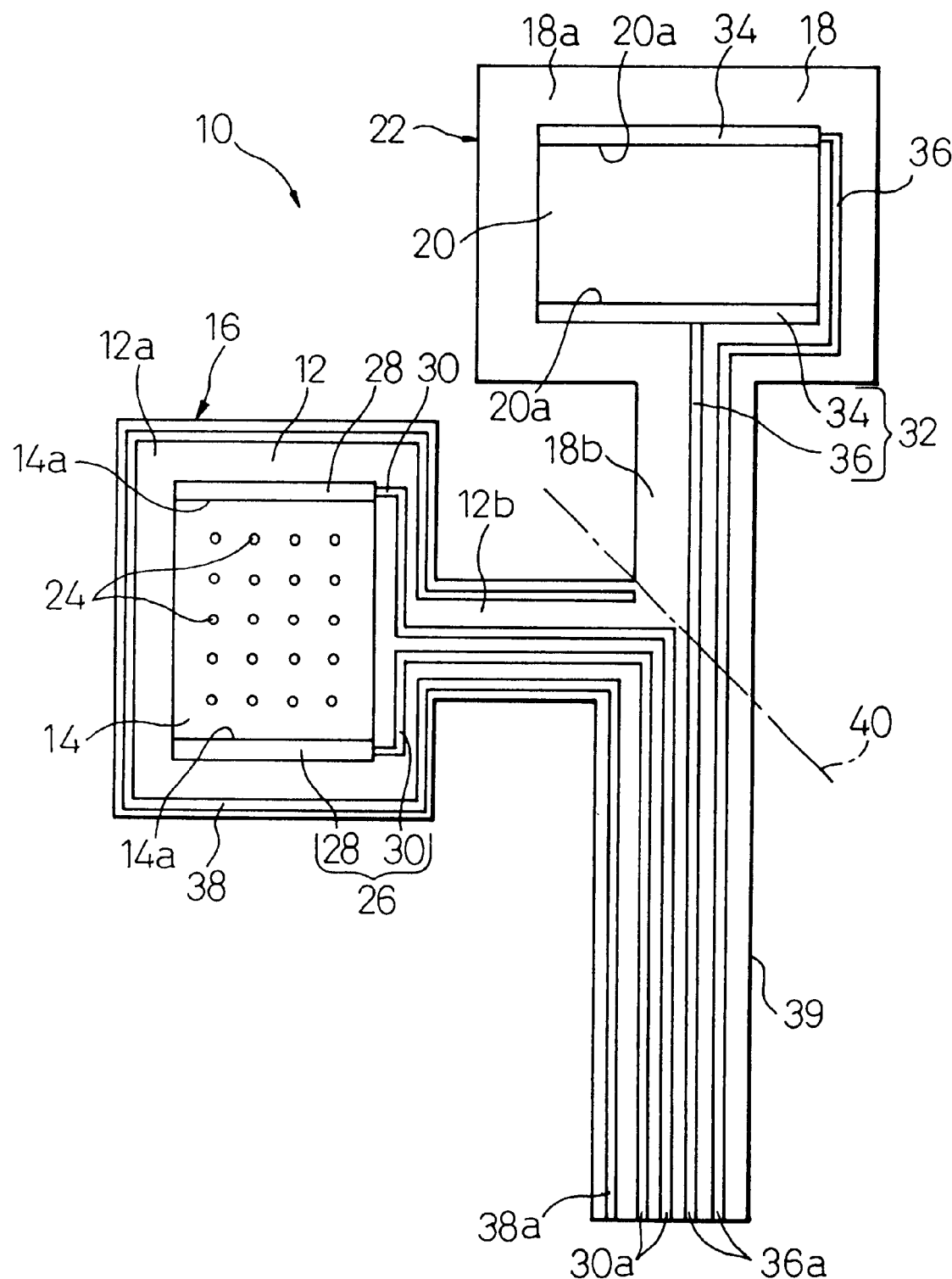
FIG. 1A is a plan view showing a first embodiment of a coordinate data input device according to the present invention in an unfolded state.
Figure 2:
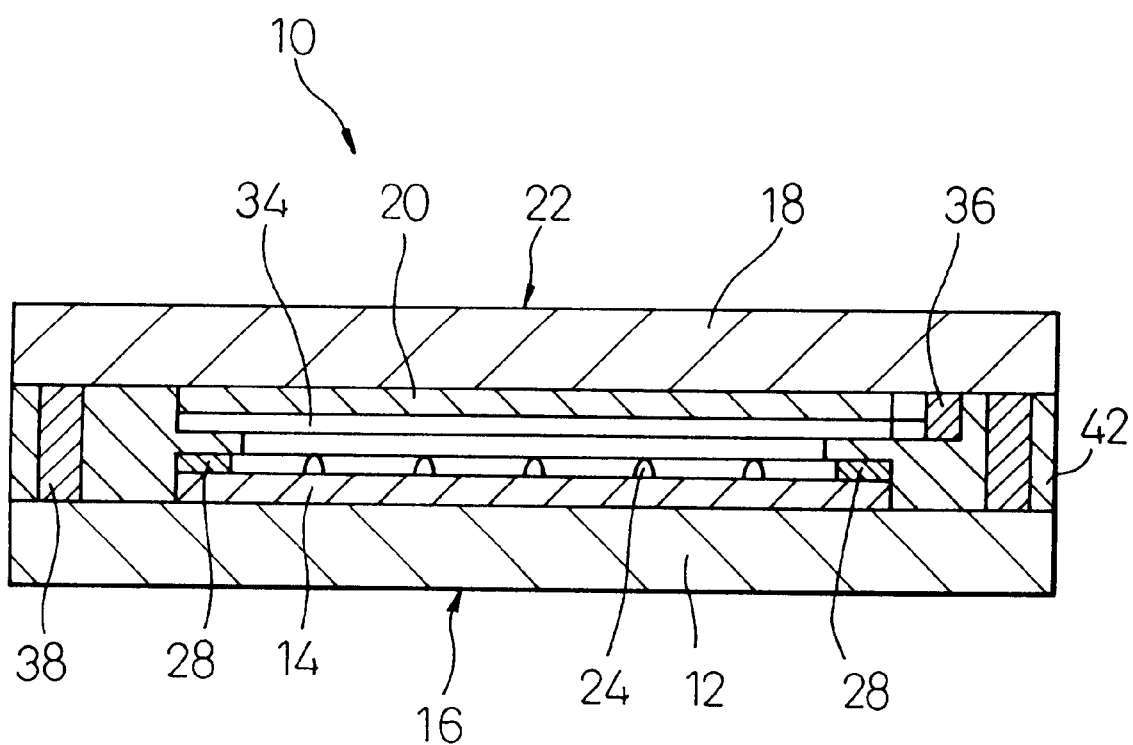
FIG. 2 is a sectional view showing the coordinate data input device of FIG. 1B, taken along line II—II of FIG. 1B, with the thickness thereof being emphasized.

Referring now to the drawings, wherein the same or similar components are designated by the common reference numerals, FIGS. 1A, 1B and 2 show a coordinate data input device 10 according to the first embodiment of the present invention. The coordinate data input device 10 can be effectively, but not exclusively, used as a touch-sensitive type pointing device (a so-called touchpad) adapted to be incorporated in a keyboard or mouse of a data processing equipment.

The coordinate data input device 10 comprises a sheet-like first detecting member 16 including an insulating substrate 12 and a resistance film 14 provided on the surface of the insulating substrate 12, and a sheet-like second detecting member 22 including an insulating substrate 18 and a resistance film 20 provided on the surface of the insulating substrate 18. The insulating substrate 12 and the resistance film 14 of the first detecting member 16 have rectangular planar shapes generally identical to those of the insulating substrate 18 and the resistance film 20 of the second detecting member 22, respectively. The detecting members 16, 22 are arranged in a face-to-face manner and superimposed to each other with a gap therebetween, with the resistance films 14, 20 being mutually opposed, in such an arrangement that the insulating substrates 12, 18, as well as the resistance films 14, 20, are mutually adjusted regarding the position and profile thereof.

A large number of dot-like spacers 24 are disposed between the superimposed first and second detecting members 16, 22 to maintain the gap therebetween. In the illustrated embodiment, the spacers 24 are formed in a uniformly distributed manner on the surface of the resistance film 14 of the first detecting member 16. The spacers 24 serve to suppress the deformation of the first and second detecting members 16, 22 due to at least a self-weight so as to hold the gap between the superimposed detecting members 16, 22, while permitting the resistance films 14, 20 to be shorted at a pushed position when at least one of the detecting members 16, 22 is deformed under a predetermined pushing force.

The first detecting member 16 is also provided with a conductor 26 formed on the surface of the insulating substrate 12 so as to be electrically connected with the resistance film 14. The conductor 26 of the first detecting member 16 includes a pair of parallel first electrodes 28 (or an electrode pair 28) laid along outer peripheral regions on the opposed shorter sides 14a of the resistance film 14 so as to be electrically connected with the resistance film 14, and a pair of first wiring strips 30 extending respectively from the first electrodes 28 and patterned on the insulating substrate 12 so as to be spaced from the resistance film 14.

The second detecting member 22 is also provided with a conductor 32 formed on the surface of the insulating substrate 18 so as to be electrically connected with the resistance film 20. The conductor 32 of the second detecting member 22 includes a pair of parallel second electrodes 34 (or an electrode pair 34) laid along outer peripheral regions on the opposed longer sides 20a of the resistance film 20 so as to be electrically connected with the resistance film 20, and a pair of second wiring strips 36 extending respectively from the second electrodes 34 and patterned on the insulating substrate 18 so as to be spaced from the resistance film 20. When the first and second detecting members 16, 22 are arranged face-to-face or assembled together, the pair of first electrodes 28 are oriented generally orthogonally to the pair of second electrodes 34, that is, the electrode pairs 28, 34 are located at angularly positions shifted by, generally, 90 degrees relative to each other.

The coordinate data input device 10 further includes a ground conductor element 38 disposed between the superimposed first and second detecting members 16, 22 so as to substantially surround the resistance films 14, 20 and the conductors 26, 32 of the superimposed detecting members 16, 22. The ground conductor element 38 is structured as a single electrically conductive line formed and patterned on the insulating substrate 12 of the first detecting member 16 along substantially the entire outer peripheral region of the insulating substrate 12 so as to be spaced from the resistance film 14, the first electrodes 28 and the first wiring strips 30. In this arrangement, when the first and second detecting members 16, 22 are arranged face-to-face or assembled together, the ground conductor element 38 also extends, as a result, along substantially the entire outer peripheral region of the insulating substrate 18 of the second detecting member 22 so as to be spaced from the resistance film 20, the second electrodes 34 and the second wiring strips 36.

In the coordinate data input device 10 of the first embodiment, the insulating substrates 12, 18 of the first and second detecting members 16, 22 are integrally formed through a stamping process in a press machine from one flexible sheet material such as a resinous film. More specifically, the insulating substrate 12 of the first detecting member 16 includes a major part 12a for carrying the resistance film 14 and an appendage part 12b extending from the major part 12a in an integral manner, and the insulating substrate 18 of the second detecting member 22 includes a major part 18a for carrying the resistance film 20 and an appendage part 18b extending from the major part 18a in an integral manner, the appendage parts 12b, 18b being integrally joined with each other at portions away from the major parts 12a, 18a so as to be continued to an extension 39.

On the common surface of the sheet material constituting the insulating substrates 12, 18 of the first and second detecting members 16, 22 having the above-described integral structure, the conductors 26, 32 of the detecting members 16, 22 and the ground conductor element 38 are formed. That is, the pair of first wiring strips 30 of the first detecting member 16 and the ground conductor element 38 are laid on the major part 12a of the insulating substrate 12 and continuously on the appendage part 12b thereof, in a pattern as shown in FIG. 1A. Also, the pair of second wiring strips 36 of the second detecting member 22 are laid on the major part 18a of the insulating substrate 18 and continuously on the appendage part 18b thereof, in a pattern as shown in FIG. 1A.

The pairs of first and second wiring strips 30, 36 and the ground conductor element 38 are continuously and convergently laid further on the extension 39. The respective distal ends 30a, 36a of the first and second wiring strips 30, 36 are located at the end of the extension 39, and are adapted to be connected to external signal and power circuits through a connector (not shown). The distal ends 38a of the ground conductor element 38 are also located at the end of the extension 39, and are adapted to be connected to a frame ground through a connector (not shown) so as to be electrically grounded.

The coordinate data input device 10 is finally assembled into a usable form (FIG. 1B) by folding the mutual joint area of the appendage parts 12b, 18b of the insulating substrates 12, 18 along a folding line 40 as shown by a dashed line in FIG. 1A so as to superimpose the second detecting member 22 on the first detecting member 16 through the spacers 24 therebetween. In this usable form, the first and second detecting members 16, 22 are fixed to each other by an adhesive layer 42 (FIG. 2), such as a double-coated pressure sensitive adhesive tape, which covers the first and second electrodes 28, 34, the first and second wiring strips 30, 36 and the ground conductor element 38. Usually, prior to the above-described folding step, resist layers (not shown) for insulating and protecting the conductors are coated on the remaining portions of the detecting members 16, 22 other than the resistance films 14, 20.

The coordinate data input device 10 thus assembled may be incorporated for use in an electronic equipment housing, such as a keyboard casing in a portable data processing equipment, in a way similar to a conventional touch-sensitive type pointing device. In this arrangement, the outer surface of either of the insulating substrates 12, 18 of the first and second detecting member 16, 22 is exposed on the surface of the equipment housing. A predetermined voltage is then alternately applied to the resistance films 14, 20 of the detecting members 16, 22 between the respective electrode pairs 28, 34, through the first and second wiring strips 30, 36 connected to the external power circuit.

In this state, when operator pushes by, e.g., his finger a desired location of the outer surface of the insulating substrate 12, 18 of one of the detecting members 16, 22, the resistance films 14, 20 are shorted to each other at the location of the pushed portion, and thereby a partial voltage corresponding to the location of the pushed or shorted portion is measured in the resistance film 14, 20 to which the voltage is not applied. In this manner, partial voltages alternately generated in the respective resistance films 14, 20 are measured, and thereby the two-dimensional coordinate of the pushed location is determined in an analog manner in two coordinate axes and processed in the data processing equipment to be converted to a digital coordinate data signal.

According to the coordinate data input device 10 having the above-described structure, the ground conductor element 38 is arranged at a position substantially surrounding the resistance films 14, 20 and the conductors 26, 32 of the superimposed first and second detecting members 16, 22, so that static electricity is mainly discharged onto the ground conductor element 38, and thereby an electro-static discharge onto the conductors 26, 32 is suppressed. As a result, electronic parts such as IC, in the signal circuit connected with the conductors 26, 32 are effectively prevented from being damaged due to the electro-static discharge. That is, the coordinate data input device 10 possesses excellent resistance to electro-static discharge.

Further, the ground conductor element 38 is structured as the single conductive line patterned on the insulating substrate 12 of the first detecting member 16, so that the ground conductor element 38 can be formed simultaneously with a process for forming the pair of first electrodes 28 and the pair of first wiring strips 30. Therefore, it is possible to avoid an increase in the number of parts and assembling steps of the coordinate data input device or the electronic equipment including the latter, and to surely prevent a remarkable rise of a manufacturing cost. Also, the insulating substrate 12 is only required to have a dimension sufficient to enable the ground conductor element 38 as the single conductive line to be laid thereon, so that it is possible to form the coordinate data input device 10 without excessively enlarging the dimension thereof. Accordingly, the coordinate data input device 10 can be relatively easily downsized, whereby it is possible to readily ensure an installation space for the device 10 even when the device 10 is adapted to be incorporated in a keyboard or mouse.

One example of a process for manufacturing the coordinate data input device 10 having the above-described structure is described below.

First, a number of resistance films 14, 20 having flat rectangular shapes are provided at predetermined positions on the surface of an electrical insulating film or sheet material through, e.g., a screen printing process. Such a sheet material may preferably be made of polyethylene terephthalate. The resistance films 14, 20 may preferably be made of carbon paste. Next, a number of spacers 24 are formed respectively on the surfaces of the resistance films 14 through, e.g., a screen printing process.

Then, the conductors 26, 32 including the electrodes 28, 34 and the wiring strips 30, 36 are provided respectively at predetermined positions on the surface of the sheet material in a predetermined pattern through, e.g., a screen printing process. The conductors 26, 32 may preferably be made of an Ag—C (silver-carbon) mixture. Simultaneously, the ground conductor elements 38 are provided at predetermined positions on the surface of the sheet material in a predetermined pattern through, e.g., a screen printing process. The ground conductor elements 38 may preferably be made of Ag—C mixture or another electrically conductive material such as aluminum.

Then, the adhesive layers 42 are provided at predetermined positions on the respective surfaces of the sheet material, the resistance films 14, 20, the conductors 26, 32 and the ground conductor elements 38 through, e.g., a screen printing process, and resist layers are additionally coated at predetermined positions on the conductors 26, 32 and the ground conductor elements 38. Thereafter, the sheet material is stamped by a press machine to form respective blanks of the coordinate data input devices 10, each of which the first and second detecting members 16, 22 are integrally connected with each other through the appendage parts 12b, 18b of the insulating substrates 12, 18. Finally, in each blank, the mutual joint area of the appendage parts 12b, 18b of the insulating substrates 12, 18 is folded along a folding line 40 so as to superimpose the second detecting member 22 on the first detecting member 16 through the spacers 24 therebetween, and the first and second detecting members 16, 22 are fixed to each other through the adhesive layer 42, whereby the coordinate data input device 10 is finished as shown in FIGS. 1B and 2.

Figure 3:
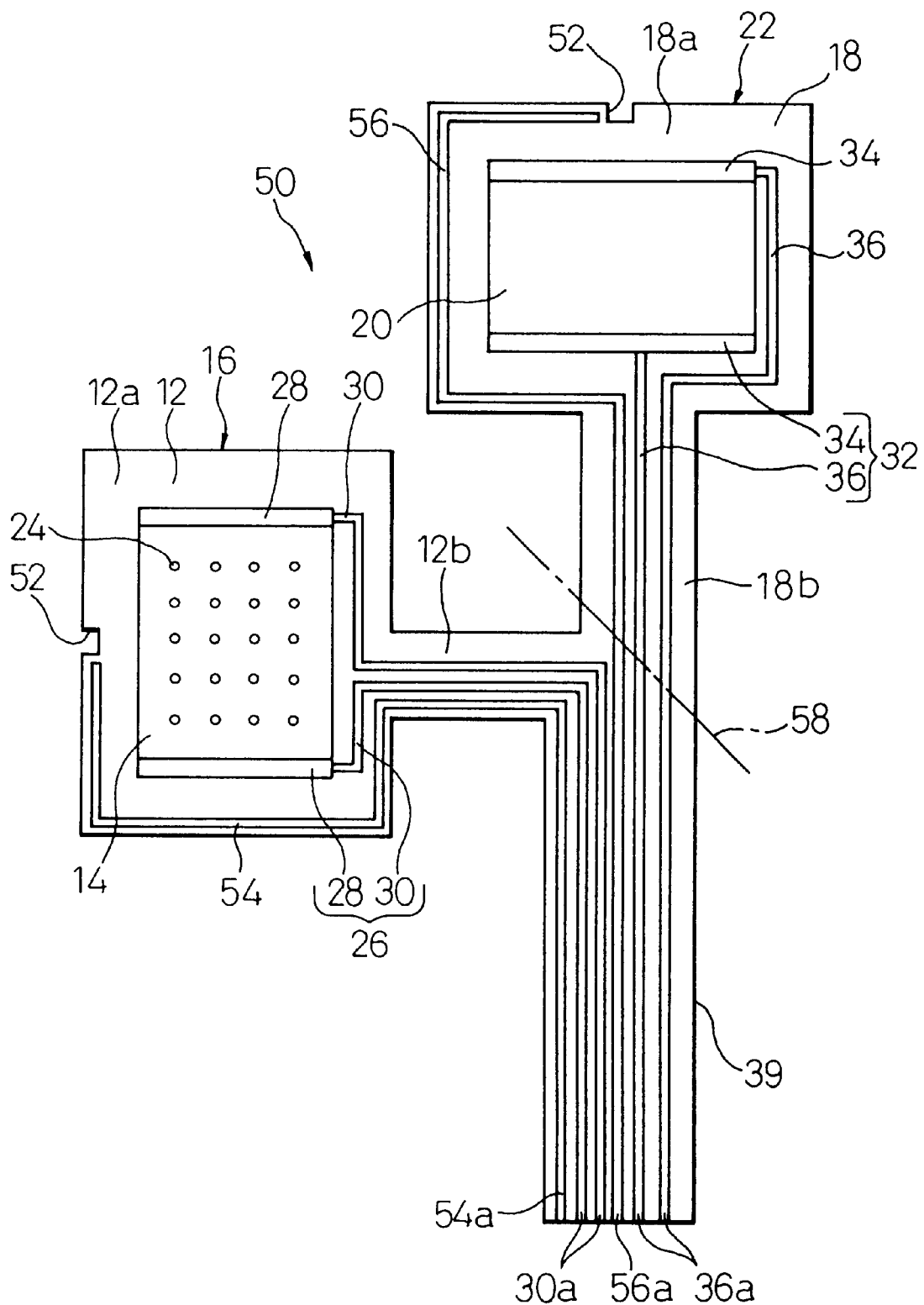
FIG. 3 is a plan view showing a second embodiment of a coordinate data input device according to the present invention in an unfolded state.

FIG. 3 shows a coordinate data input device 50 according to the second embodiment of the present invention in an unfolded state. The constitution of the coordinate data input device 50 is generally identical to that of the coordinate data input device 10 shown in FIG. 1A, except for the structure of a ground conductor element as a countermeasure to an electro-static discharge. Therefore, the corresponding components or features are denoted by common reference numerals and the detailed descriptions thereof are not repeated.

In the coordinate data input device 50, the major parts 12a, 18a of the insulating substrates 12, 18 of the first and second detecting members 16, 22 are respectively provided with notches 52 at the desired positions on the outer peripheral edges of the major parts 12a, 18a, which act to locate the device 50 in position in an electronic equipment housing. In this construction, it is difficult to form the ground conductor element as a single continuous line surrounding the resistance films 14, 20 and the conductors 26, 32 on the surface of either of the insulating substrates 12, 18, as the ground conductor element 38 of the above-described coordinate data input device 10.

Therefore, the coordinate data input device 50 is provided with first and second ground conductor elements 54, 56 formed by independently patterning respective single electrically conductive lines on the insulating substrates 12, 18 of the first and second detecting member 16, 22. The first ground conductor element 54 provided in the first detecting member 16 is structured as a single continuous conductive line patterned along a part of outer peripheral region of the insulating substrate 12 so as to be spaced from the resistance film 14, the first electrodes 28 and the first wiring strips 30. The second ground conductor element 56 provided in the second detecting member 22 is also structured as a single continuous conductive line patterned along a part of outer peripheral region of the insulating substrate 18 so as to be spaced from the resistance film 20, the second electrodes 34 and the second wiring strips 36. When the first and second detecting members 16, 22 are superimposed on each other, the first and second ground conductor elements 54, 56 cooperate in a compensating manner to substantially surround the resistance films 14, 20 and the conductors 26, 32, in the same way as the ground conductor element 38 of the coordinate data input device 10.

The first ground conductor element 54 of the first detecting member 16 is laid on the major part 12a of the insulating substrate 12 and continuously on the appendage part 12b thereof, in a pattern as shown in FIG. 3. Also, the second ground conductor element 56 of the second detecting member 22 is laid on the major part 18a of the insulating substrate 18 and continuously on the appendage part 18b thereof, in a pattern as shown in FIG. 3. The first and second ground conductor elements 54, 56 are continuously and convergently laid further on the extension 39. The respective distal ends 54a, 56a of the first and second ground conductor elements 54, 56 are located at the end of the extension 39, and are adapted to be connected to a frame ground through a connector (not shown) so as to be electrically grounded.

The coordinate data input device 50 is finally assembled into a usable form by folding the mutual joint area of the appendage parts 12b, 18b of the insulating substrates 12, 18 along a folding line 58 as shown by a dashed line in FIG. 3 so as to superimpose the second detecting member 22 on the first detecting member 16 through the spacers 24 therebetween. It will be appreciated that the coordinate data input device 50 thus assembled can provide various effects equivalent to those of the coordinate data input device 10 of the first embodiment.

Figure 4A:
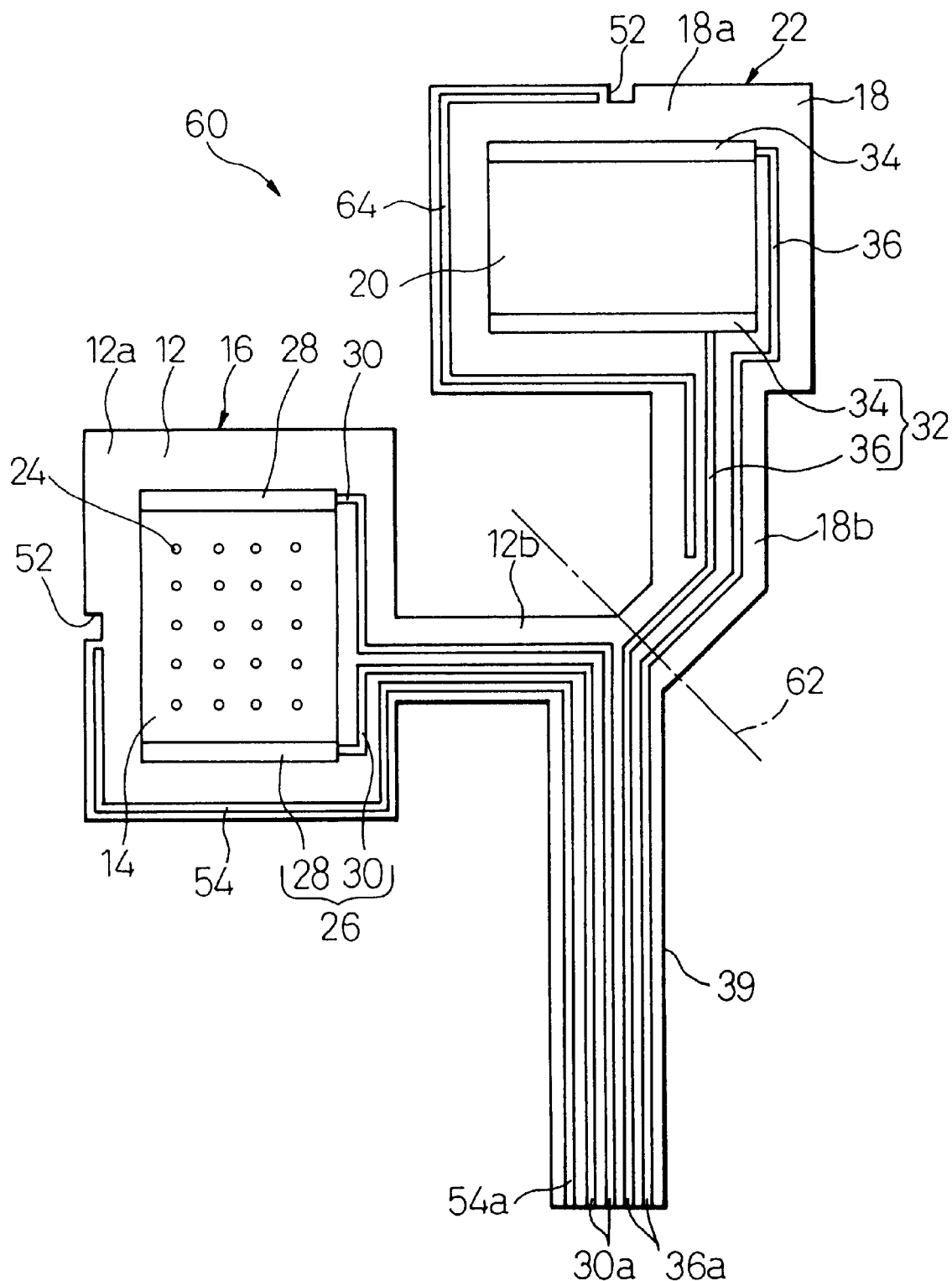
FIG. 4A is a plan view showing a third embodiment of a coordinate data input device according to the present invention in an unfolded state.
Figure 5:
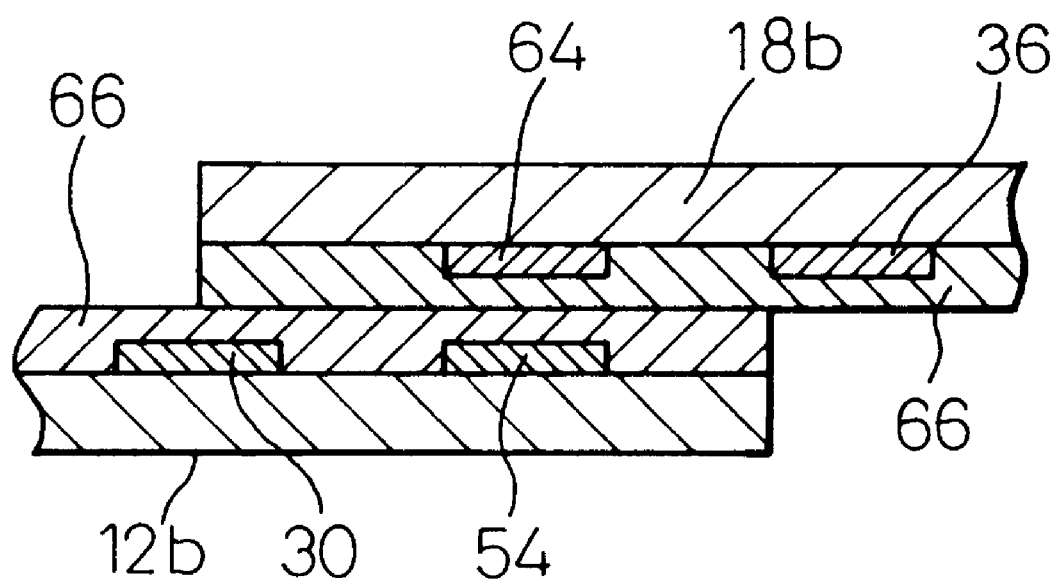
FIG. 5 is a sectional view showing the coordinate data input device of FIG. 4B, taken along line V—V of FIG. 4B, with the thickness thereof being emphasized.

FIGS. 4A, 4B and 5 show a coordinate data input device 60 according to the third embodiment of the present invention. The constitution of the coordinate data input device 60 is generally identical to that of the coordinate data input device 50 shown in FIG. 3, except for the structure of a second ground conductor element provided in the second detecting member 22. Therefore, the corresponding components or features are denoted by common reference numerals and the detailed descriptions thereof are not repeated.

In the coordinate data input device 60, the appendage part 18b of the insulating substrate 18 of the second detecting member 22 has a laterally deviated or bent geometry in relation to a folding line 62 defined in the joint area with the appendage part 12b of the insulating substrate 12 of the first detecting member 16, which is different from the straight appendage part 18b in the coordinate data input device 50. Thus, the pair of second wiring strips 36 and a second ground conductor element 64, provided on the insulating substrate 18 of the second detecting member 22, are laid on the major part 18a of the insulating substrate 18 and continuously on the appendage part 18b thereof, in a pattern as shown in FIG. 4A. The second wiring strips 36 are continuously and convergently laid further on the extension 39 in the same way as in the coordinate data input device 50, but the second ground conductor element 64 is terminated at a midway on the appendage part 18b and is not laid on the extension 39.

In the coordinate data input device 60, when the mutual joint area of the appendage parts 12b, 18b of the insulating substrates 12, 18 is folded along a folding line 62 so as to superimpose the second detecting member 22 on the first detecting member 16 through the spacers 24 therebetween, the first and second ground conductor elements 54, 64 cooperate in a compensating manner to substantially surround the resistance films 14, 20 and the conductors 26, 32 of the detecting members 16, 22, in the same way as the ground conductor element 38 of the coordinate data input device 10. In this assembled or folded state, a part of the second ground conductor element 64 located on the appendage part 18b of the insulating substrate 18 is aligned to and overlapped above a part of the first ground conductor element 54 located on the appendage part 12b of the insulating substrate 12 with resist layers 66 coated on both appendage parts 12a, 12b being interposed therebetween, as shown in FIG. 5.

According to this arrangement, when static electricity is discharged onto the second ground conductor element 64 in the second detecting member 22, a current flows through the resist layers 66 between the overlapped parts of the first and second ground conductor elements 54, 64 because of the relatively high voltage of the electro-static discharge. This phenomenon is promoted especially when the resist layers 66 include pin holes. Consequently, the second ground conductor element 64 is electrically grounded through the first ground conductor element 54 when a high voltage is applied to the second ground conductor element 64. In this way, the coordinate data input device 60 can provide various effects similar to those of the coordinate data input device 10 of the first embodiment. Moreover, the coordinate data input device 60 can possess an advantage that the second ground conductor element 64 is not laid on the extension 39 and thus a connector for connecting the conductors in the device 60 to a signal circuit or a frame ground can have a structure similar to that of the connector used for the device 10, without increasing the number of contacts in the connector.

Figure 6:
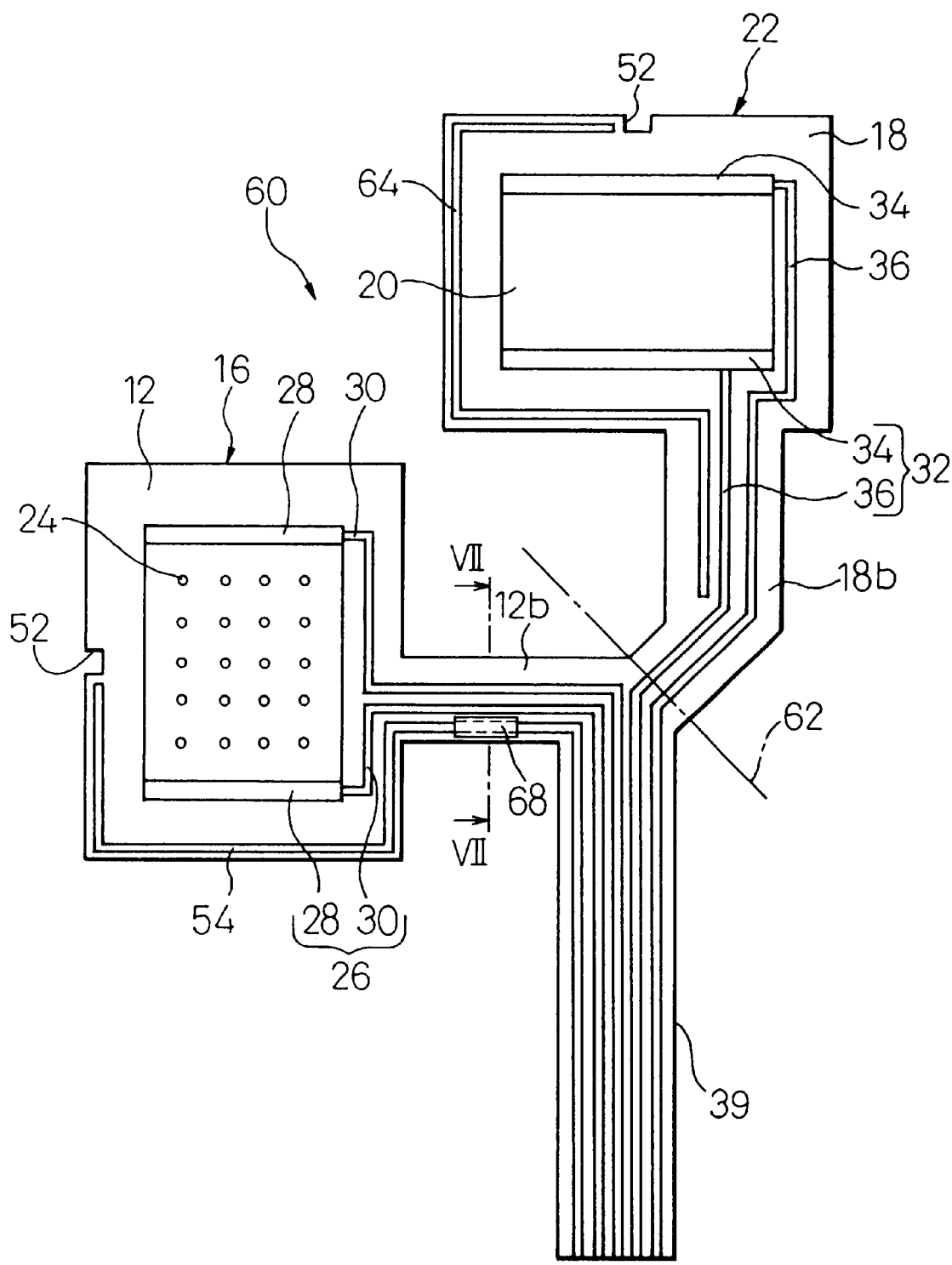
FIG. 6 is a plan view showing a modification of the coordinate data input device of FIG. 4A.

FIG. 6 shows a modification of the coordinate data input device 60 in an unfolded state. In this modification, an electrically conductive piece 68 is interposed between the overlapped parts of the first and second ground conductor elements 54, 64, so as to improve the reliability of the indirect grounding for the second ground conductor element 64 as described. The conductive piece 68 may be made of any electrical conductive material. For example, when the conductive piece 68 is made from an electrically conductive adhesive, the conductive piece 68 can advantageously exert both an electrical conducting function between the first and second ground conductor elements 54, 64 and an adhering function between the appendage parts 12b, 18b of the insulating substrates 12, 18 of the first and second detecting members 16, 22.

Figure 7A:
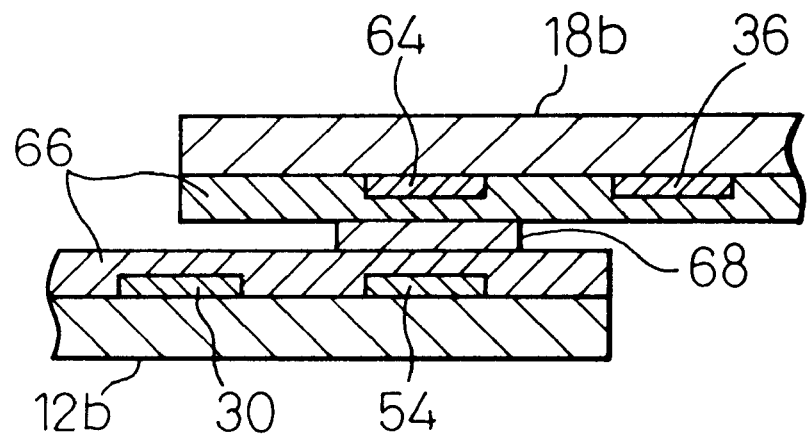
FIG. 7A is a sectional view showing the coordinate data input device of FIG. 6 in a folded usable state, taken along line VII—VII of FIG. 6, with the thickness thereof being emphasized.
Figure 7B:
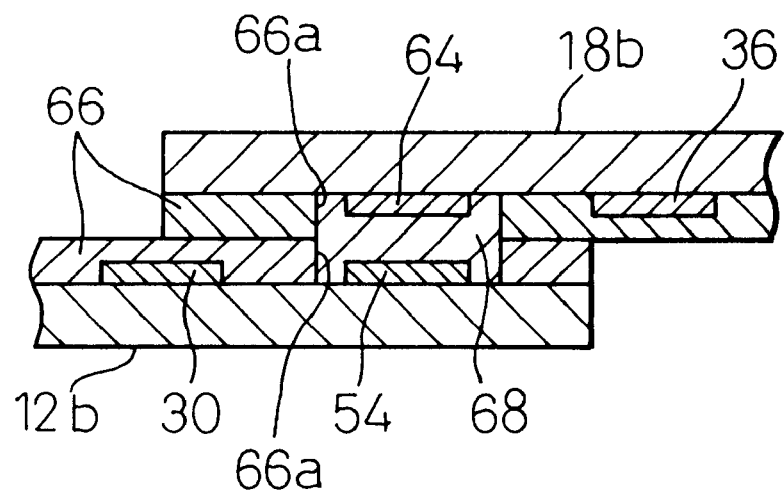
FIG. 7B is a sectional view showing another aspect of the coordinate data input device of FIG. 6 in a folded usable state, taken along line VII—VII of FIG. 6, with the thickness thereof being emphasized.

In this arrangement, the conductive piece 68 may be interposed between the resist layers 66 coated on the appendage parts 12b, 18b, as shown in FIG. 7A. Alternatively, the conductive piece 68 may be filled in recesses 66a of the resist layers 66, which may be formed by coating the resist layers 66 in such a manner as to locally avoid the mutually overlapped parts of the first and second ground conductor elements 54, 64, as shown in FIG. 7B. In the latter construction, the conductive piece 68 is in direct contact with the first and second ground conductor elements 54, 64, so that it is possible to further improve the reliability and stability of the indirect grounding for the second ground conductor element 64 through the first ground conductor element 54.

Figure 8:
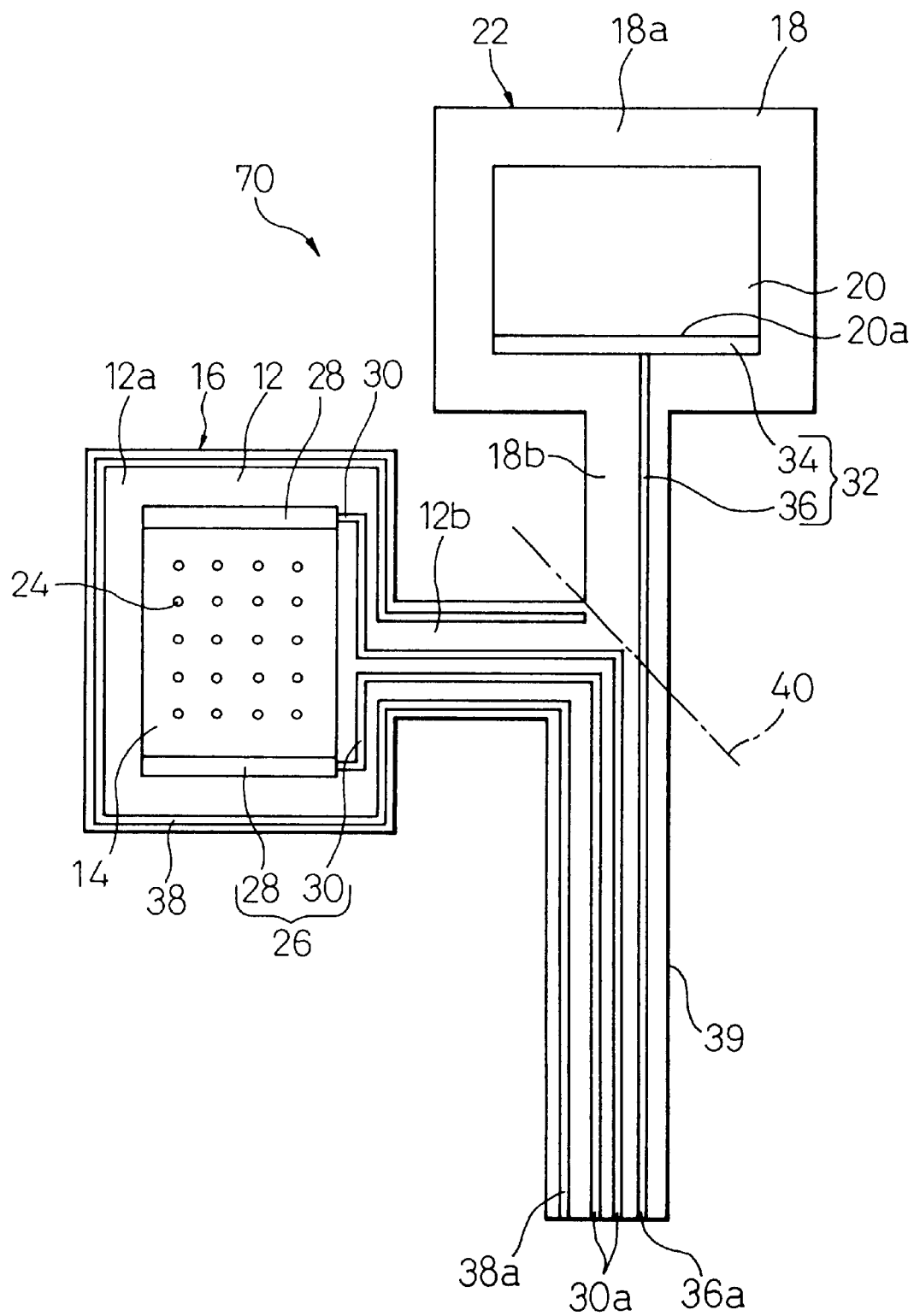
FIG. 8 is a plan view showing a fourth embodiment of a coordinate data input device according to the present invention in an unfolded state.

FIG. 8 shows a coordinate data input device 70 according to the fourth embodiment of the present invention in an unfolded state. The constitution of the coordinate data input device 70 is generally identical to that of the coordinate data input device 10 shown in FIG. 1A, except for the data entering mechanism of the superimposed resistance films 14, 20. Therefore, the corresponding components or features are denoted by common reference numerals and the detailed descriptions thereof are not repeated.

In the coordinate data input device 70, the conductors 32 of the second detecting member 22 include one second electrode 34 disposed along an outer peripheral region on one longer side 20a of the resistance film 20 so as to be electrically connected with the resistance film 20, and one second wiring strip 36 extending from the second electrode 34 and patterned on the insulating substrate 18 so as to be spaced from the resistance film 20.

In the coordinate data input device 70, a predetermined voltage is applied to the resistance film 14 of the first detecting member 16 between the electrode pair 28 through the pair of first wiring strips 30 connected to the external power circuit. During this state, when operator pushes by, e.g., his finger a desired location of the outer surface of the insulating substrate 12, 18 of one of the detecting members 16, 22, the resistance films 14, 20 are shorted to each other at the location of the pushed portion, and thereby a partial voltage corresponding to the location of the pushed or shorted portion is measured in the resistance film 20 of the second detecting member 22 to which the voltage is not applied. In this manner, the two-dimensional coordinate of the pushed location is determined in an analog manner in only one coordinate axis and processed in the data processing equipment to be converted to a digital coordinate data signal.

According to the coordinate data input device 70 having the above-described structure, the ground conductor element 38 can effectively serve to suppress an electro-static discharge to the conductors 26, 32.

While the invention has been particularly shown and described with reference to preferred embodiments thereof, it will be understood by those skilled in the art that various changes and modifications may be made without departing from the spirit and scope of the invention. For example, in each of the above-described coordinate data input devices, the appendage parts of the insulating substrates of the first and second detecting members may have various profiles other than those shown in the figures. Also, the coordinate data input devices according to the present invention may be used as a transparent-panel type input device adapted to be mounted on a display screen such as LCD, CRT and so on. In this application, the insulating substrates of the first and second detecting members are made of a transparent material, and particularly, the lower detecting member arranged adjacent to the display screen is preferably provided with the insulating substrate made of glass. Therefore, the scope of the invention is to be determined solely by the following claims.

What is claimed is:

1. A coordinate data input device, comprising:
   a pair of detecting members, each including an insulating substrate, a resistance film provided on said insulating substrate and a conductor formed on said insulating substrate to be electrically connected with said resistance film, said pair of detecting members being arranged in a face-to-face manner such that said respective resistance films of said detecting members are opposed to each other;
   a spacer disposed between said pair of detecting members to define a gap between said respective resistance films, said spacer permitting said resistance films to be shorted with each other when at least one of said detecting members is deformed; and
   a ground conductor element formed on at least one of said pair of detecting members, said ground conductor element being located so as to be spaced from and substantially surround said resistance films and conductors of both of said detecting members.

2. The coordinate data input device of claim 1, wherein said ground conductor element is formed as a single electrically conductive line patterned on said insulating substrate of one of said detecting members.

3. The coordinate data input device of claim 1, wherein said ground conductor element is formed as a pair of electrically conductive lines respectively patterned on insulating substrates of each of said detecting members.

4. The coordinate data input device of claim 3, wherein said pair of electrically conductive lines are partially overlapped with each other.

5. The coordinate data input device of claim 4, wherein an electrically conductive piece is interposed between overlapped portions of said pair of electrically conductive lines.

6. The coordinate data input device of claim 5, wherein said electrically conductive piece is made of an electrically conductive adhesive.

7. The coordinate data input device of claim 1, wherein said insulating substrate of each of said detecting members includes a major part for carrying said resistance film and an appendage part extending from said major part, and wherein insulating substrates of said detecting members are integrally joined with each other through respective appendage parts.

8. The coordinate data input device of claim 7, wherein said conductor of each of said detecting members is laid on said major part and continuously on said appendage part, and wherein said ground conductor element is laid on said major part and continuously on said appendage part of at least one of said detecting members.

9. The coordinate data input device of claim 1, wherein said conductor of one of said detecting members includes a pair of first electrodes electrically connected with said resistance film of one of said detecting members and a pair of first wiring strips extending respectively from said first electrodes and patterned on said insulating substrate of one of said detecting members, and wherein said conductor of the other of said detecting members includes a pair of second electrodes electrically connected with said resistance film of other of said detecting members and a pair of second wiring strips extending respectively from said second electrodes and patterned on said insulating substrate of the other of said detecting members, said pair of first electrodes being oriented generally orthogonally to said pair of second electrodes.

10. The coordinate data input device of claim 1, wherein said conductor of one of said detecting members includes a pair of first electrodes electrically connected with said resistance film of one of said detecting members and a pair of first wiring strips extending respectively from said first electrodes and patterned on said insulating substrate of one of said detecting members, and wherein said conductor of the other of said detecting members includes a single second electrode electrically connected with said resistance film of the other of said detecting members and a single second wiring strip extending from said single electrode and patterned on said insulating substrate of the other of said detecting members, said pair of first electrodes being oriented generally orthogonally to said single electrode.

11. A coordinate data input device, comprising:
   a pair of resistive detecting members arranged in a face-to-face manner such that a deformation of one of the resistive detecting members to contact the other of the resistive detecting members will cause the pair of resistive detecting members to be shorted;
   a ground conductor element formed on one and/or the other of the resistive detecting members so as to substantially surround an interior of said resistance detecting members, such that the ground conductor element prevents electro-static discharges from penetrating conductors for each of the resistive detecting members.

12. The coordinate data input device of claim 11, wherein said ground conductor element is formed as a single electrically conductive line patterned on an insulating substrate of one of the resistive detecting members.

13. The coordinate data input device of claim 11, wherein said ground conductor element is formed as a pair of electrically conductive lines respectively patterned on insulating substrates of each of the resistive detecting members.

14. The coordinate data in put device of claim 11, wherein an electrically conductive piece is interposed between overlapped portions of said ground conductor element formed on each of the resistive detecting members.

* * * * *